US009641810B2

(12) United States Patent
Zufferey et al.

(10) Patent No.: US 9,641,810 B2
(45) Date of Patent: May 2, 2017

(54) METHOD FOR ACQUIRING IMAGES FROM ARBITRARY PERSPECTIVES WITH UAVS EQUIPPED WITH FIXED IMAGERS (75) Inventors: Jean-Christophe Zufferey, Etagnieres (CH); Antoine Beyeler, Lausanne (CH)

(73) Assignee: SENSEFLY S.A., Cheseaux-sur-Lausanne (CH)

( * ) Notice: Subject to any disclaimer, the term of this patent is extended or adjusted under 35 U.S.C. 154(b) by 554 days.

(21) Appl. No.: 14/233,290

(22) PCT Filed: Jun. 21, 2012

(86) PCT No.: PCT/EP2012/061928
§ 371 (c)(1),
(2), (4) Date: Jan. 16, 2014

(87) PCT Pub. No.: WO2012/175592
PCT Pub. Date: Dec. 27, 2012

(65) Prior Publication Data
US 2014/0192193 A1 Jul. 10, 2014

Related U.S. Application Data (60) Provisional application No. 61/499,726, filed on Jun. 22, 2011.

(30) Foreign Application Priority Data

Jun. 22, 2011 (EP) ..................................... 11170993

(51) Int. Cl.
H04N 7/18 (2006.01)
B64D 47/08 (2006.01)
G05D 1/00 (2006.01)

(52) U.S. Cl.
CPC ............. *H04N 7/183* (2013.01); *B64D 47/08* (2013.01); *G05D 1/0094* (2013.01)

(58) Field of Classification Search
CPC ............ B64C 39/024; B64C 2201/127; B64C 2201/146; B64C 2201/141;
(Continued)

(56) References Cited

U.S. PATENT DOCUMENTS 5,035,382 A * 7/1991 Lissaman ............... A63H 27/00
244/120
6,712,312 B1 * 3/2004 Kucik .................. B64C 39/024
244/1 R
(Continued)

OTHER PUBLICATIONS

Ceccarelli, Nicola, et al. "Micro UAV path planning for reconnaissance in wind." American Control Conference, 2007. ACC'07. IEEE, 2007.*
(Continued)

*Primary Examiner* — Nathnael Aynalem
(74) *Attorney, Agent, or Firm* — DLA Piper LLP (US)

(57) ABSTRACT

A method for acquiring images of a photographic target from arbitrary perspectives with an unmanned aerial vehicle (UAV) equipped with at least one image acquisition device having a fixed acquisition direction with respect to the vehicle, said UAV having automatic navigation means allowing to reach an arbitrary location and automatic attitude control means allowing to transiently reach an arbitrary orientation in space, said photographic target being outside the current field of view of the acquisition device while the UAV flies along a predefined flying path, this method comprising: computing a target UAV position and an orientation in space required to acquire a desired image from a set of parameters, navigating to said target UAV position, modifying an attitude of the UAV in order to modify the acquisition direction to point toward the photographic target, acquiring images, and starting a recovery phase by controlling the UAV back to cruise attitude and navigate back along the predefined flying path.

9 Claims, 7 Drawing Sheets (58) Field of Classification Search
CPC .......... B64C 2201/12; B64C 2201/027; B64C 2201/14; B64C 2201/123; B64C 2201/042; G06K 9/00255; H04N 7/181; H04N 5/232; H04N 7/185; G01S 19/13; G01S 13/867; G01S 13/86; G01S 13/885; G05D 1/101
USPC ...... 701/2, 23, 448, 468; 348/116, 117, 143, 348/144
See application file for complete search history.

(56) References Cited

U.S. PATENT DOCUMENTS

| | | | |
|---|---|---|---|
| 2005/0280705 A1* | 12/2005 | Anderson, Jr. | H04N 7/185 348/143 |
| 2009/0187299 A1 | 7/2009 | Fregene et al. | |
| 2010/0286859 A1 | 11/2010 | Feigh et al. | |
| 2012/0059536 A1* | 3/2012 | Pepicelli | B64C 39/024 701/11 |

OTHER PUBLICATIONS

Petrie, Gordon. "Systematic oblique aerial photography using multiple digital cameras." VIII International Scientific and Technical Conference "From Imagery to Map: Digital Photogrammetric Technologies," University of Glasgow. 2008.*

Frew, Eric, et al. "Vision-based road-following using a small autonomous aircraft." Aerospace Conference, 2004. Proceedings. 2004 IEEE. vol. 5. IEEE, 2004.*

Kim, H. Jin, and David H. Shim. "A flight control system for aerial robots: algorithms and experiments." Control engineering practice 11.12 (2003): 1389-1400.*

Niculescu, Marius. "Lateral track control law for Aerosonde UAV." AIAA, Aerospace Sciences Meeting and Exhibit, 39 th, Reno, NV. 2001.*

Rysdyk, Rolf. "Unmanned aerial vehicle path following for target observation in wind." Journal of guidance, control, and dynamics 29.5 (2006): 1092-1100.*

International Search Report issued in International Application No. PCT/EP2012/061928, dated Sep. 14, 2012.

Written Opinion issued in International Application No. PCT/EP2012/061928, dated Sep. 14, 2012.

Nicola Ceccarelli et al., "Micro UAV Path Planning for Reconnaissance in Wind", Proceedings of the 2007 American Control Conference, New York City, USA, FrB12.3, pp. 5310-5315, Jul. 11-13, 2007.

* cited by examiner

METHOD FOR ACQUIRING IMAGES FROM ARBITRARY PERSPECTIVES WITH UAVS EQUIPPED WITH FIXED IMAGERS

CROSS REFERENCE TO RELATED APPLICATIONS

This application is a U.S. National Stage Application of International Application No. PCT/EP2012/061928 filed Jun. 21, 2012, which claims priority from European Patent Application No. 11170993.7 filed Jun. 22, 2011 and U.S. Provisional Patent Application No. 61/499,726 filed Jun. 22, 2011.

FIELD OF THE INVENTION

The present invention relates to a method for acquiring images of photographic targets from arbitrary perspectives with an unmanned aerial vehicle (hereafter UAV) equipped with fixed imager(s) by using automatic attitude control and navigation means.

TECHNICAL BACKGROUND

The invention relates to the field of aerial imagery acquisition by lightweight UAVs. Note that imagery refers to any kind of image acquisition using any kind of imager ranging from standard, visible spectrum cameras to narrow band or multispectral sensors.

UAVs are generally equipped with some form of automatic navigation means that allow them to sequentially navigate along predetermined paths, towards given geographic locations (or waypoints), which are defined by their GPS coordinates and altitude. In most cases, the automatic navigation means rely at least on a GPS (Global Positioning System) receiver to function.

Figure 1:
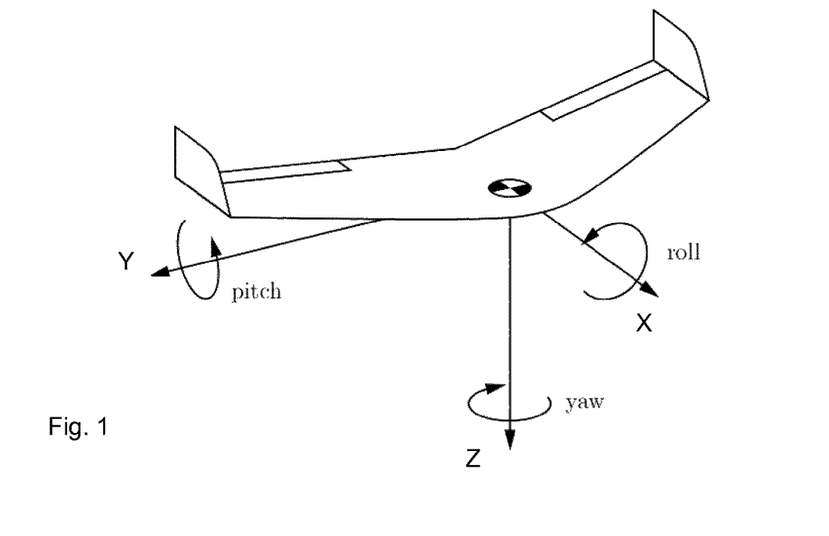
FIG. 1 shows an example of aircraft or UAV with the three axes controlled by the automatic attitude control means: the pitch (Y axis), roll (X axis) and the yaw (Z axis).

UAVs are also often equipped with some form of automatic attitude control means that allow the control of the aircraft orientation in space (often defined by the three Euler angles: yaw, pitch and roll, see FIG. 1) and reject perturbations from wind or turbulences. The automatic attitude control means are typically used by the automatic navigation means to control the UAV trajectory. For example, if the UAV should reach a higher altitude, the automatic navigation means will instruct the automatic attitude control means to regulate a nose-up orientation, which will result in the UAV climbing. Likewise, the automatic navigation means usually achieve changes of heading by instructing the automatic attitude control means to regulate a laterally tilted, or rolled, attitude.

In the field of aerial imaging, distinction is made between images taken by a camera which objective is directed perpendicularly with respect to the ground and slanted images taken from an arbitrary perspective, i.e. with an arbitrary orientation of the camera. In order to acquire slanted images of some photographic target, UAVs typically rely on a pan-tilt apparatus or similar mechanical contraption to change the relative orientation of the imager with respect to the UAV. This apparatus comes with a cost in terms of weight and complexity, which negatively impacts the price, size and robustness of small UAVs. For this reason, a class of small UAVs exists that are equipped with imagers with a fixed orientation with respect to the UAV. These UAVs are generally able to get images in a vertical direction, or at some predefined and fixed angles, but not from arbitrarily perspectives.

In order to uniquely define a perspective on a photographic target, a set of parameters must be provided. An example of such set is:
  the bearing and the altitude of the imager with respect to the photographic target
  the distance between the photographic target and the camera (which, at a given focal length or zoom settings, is proportional to the area around the photographic target that will be covered by the image)
Slanted images taken from arbitrary perspectives are useful in many cases such as:
  Specific views for security purposes, for example observing or mapping building walls, bridges, monuments, etc.
  Images of steep slopes for geological studies (mountains, glaciers, cliffs, etc.), or agricultural purposes as for example observing vineyards.
  Openings to new purposes in architecture, housing market, civil engineering, military and spying applications, etc.

The known method for acquiring slanted images by a UAV uses a "pan-tilt" system allowing arbitrary directing the camera relative to the aircraft. A drawback of such a system is its mechanical complexity, high weight and relative high cost. Therefore, it becomes advantageous to use a (set of) camera(s) rigidly attached to the airframe of the UAV.

Some methods exist that allow to cope with airplanes having fixed cameras. However, they always assume a globally level orientation of the plane attitude during the acquisition of images and therefore rely on pre-planning of straight lines towards waypoints. For instance the document "CECCARELLI N ET AL: "Micro UAV Path Planning for Reconnaissance in Wind", AMERICAN CONTROL CONFERENCE, 2007. ACC'07, IEEE, PISCATAWAY, N.J., USA, 9 Jul. 2007, addresses the control of a Micro Unmanned Aerial Vehicle (MAV) for the purpose of obtaining video footage of a set of known ground targets with preferred azimuthal viewing angles, using fixed onboard cameras. In this case, the control is exercised only through the selection of classical waypoints, without interruption of the classical navigation to temporary control of the orientation or the attitude of the plane to orient the objective towards the target. In particular:
  the strategy is limited to acting on the position of classical attracting waypoints by making sure in advance that the waypoints are positioned intelligently so that the fixed camera will be aiming to the target when the plane is flying straight and almost level between the waypoints
  the plane is not actively tilted during the picture taking process in order to further orient the objective towards the target, therefore the proposed method will not work with camera looking straight downward,
  the altitude is not expected to vary during the picture taking process,
  the preferred angle defining the perspective of the image is only azimuthal, whereas the elevation is arbitrary The document US 2010/286859 describes the generation of a flight plan made of a plurality of waypoints such that the camera "overlaps" the target. The method comprises graphically identifying, on a map displayed on the display device, a desired target for the surveillance module. The camera will take pictures along the programmed flight plan. This method is only suitable for taking pictures while the aerial vehicle is following a flying path. The altitude or the orientation of the flight plan can be modified in order to take the picture in an adequate way.

However, none of the existing methods allows taking pictures of predefined targets by transiently orienting the plane (and therefore the camera) towards the target. They rather assume level flight towards waypoints that have been intelligently positioned in order to make sure the camera will see the targets at some point. These existing methods therefore significantly limit the kinds of perspectives one can achieve and require the entire flight planning (by positioning the waypoints) to be made accordingly to the targets to be imaged.

SUMMARY OF THE INVENTION

The aim of the invention is to acquire images from arbitrary perspectives in absence of a "pan-tilt" system by using the inherent agility of small UAVs (in particular of the "swinglet CAM", a small UAV weighing approximately 500 grams and featuring less than 1 meter wingspan), and their automatic navigation and attitude control means.

This aim is achieved by a method for acquiring images of a photographic target from arbitrary perspectives with an unmanned aerial vehicle (UAV) equipped with at least one image acquisition device having a fixed acquisition direction with respect to the vehicle, said unmanned aerial vehicle (UAV) having automatic navigation means allowing to reach an arbitrary location and automatic attitude control means allowing to transiently reach an arbitrary orientation in space, said photographic target being outside the current field of view of the acquisition device while the UAV flies along its predefined flying path, this method comprising the steps of:

- from a set of parameters pertaining to the desired photographic target, desired perspective and from the relative orientation of the image acquisition device with respect to the UAV, computing a target UAV position and an orientation in space required to acquire a desired slanted image
- navigating using the automatic navigation means to said target UAV position,
- temporarily modifying the attitude (at least one of the pitch, roll or yaw angle) of the UAV in order to modify the acquisition direction to point toward the photographic target,
- acquiring images while the attitude of the UAV is modified and when the acquisition direction points toward the photographic target with the desired perspective,
- starting a recovery phase by controlling the UAV back to cruise attitude and navigate back along the predefined flying path.

A further object of the invention is a UAV equipped with at least one image acquisition device having a fixed acquisition direction with respect to the vehicle, said UAV having automatic navigation means controlling the pitch, roll and the yaw in order to fly along a predefined path until a photographic target being outside the current field of view of the acquisition device while the UAV flies along its predefined path, the UAV further comprises

- means for interrupting the automatic navigation means in the vicinity of the photographic target,
- means for modifying at least one of the pitch, roll or yaw in order to modify the acquisition direction to point toward the photographic target and to acquire images with the image acquisition device,
- means for restarting the navigation means for moving the UAV back to the predefined path.

In accordance with the present invention, the UAV flies according to two modes. The first one is predefined and stored in the UAV and defines the flight plan. The other one is a transient mode during which the UAV puts itself in condition to take the desired pictures. This transient mode is necessary since in general the behavior of the UAV in normal flying conditions does not allow to take the picture with the desired perspective. Once the picture (or series of pictures) is taken the automatic flying mode is re-enabled and the UAV joins the predefined flying path.

BRIEF DESCRIPTION OF THE FIGURES

The present invention will be better understood thanks to the attached figures in which.

DETAILED DESCRIPTION OF THE INVENTION

The UAV of the invention equipped with at least one image acquisition device comprises automatic navigation means (mainly supplied with geographical coordinate data from a GPS) and automatic attitude control means (mainly supplied with data from an inertial measurement unit (IMU)). It has to be noticed that the image acquisition device(s) is/are arranged on a fixed position on the UAV, which agility allows any maneuver in the aeronautical limits to approach a specific photographic target PT and orient its airframe. Depending on the design, the image acquisition devices may be placed at any location on the UAV and with any orientation. During regular operation, the UAV is generally navigating along predefined locations (or waypoints) to achieve a predefined flight path (PP).

Figure 2:
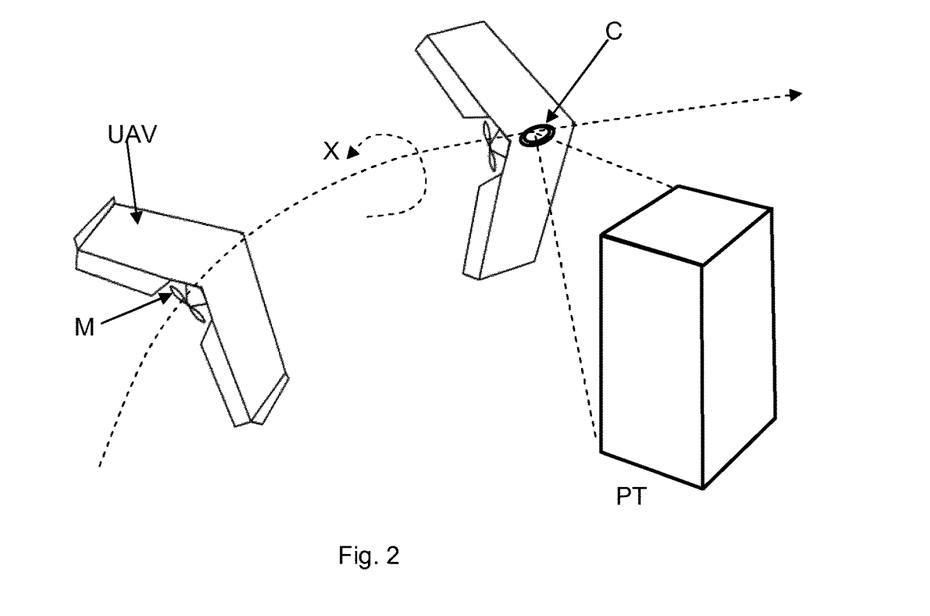
FIG. 2 shows a UAV rolling on its flight path for acquiring images of a photographic target.

In order to acquire a slanted image with a given perspective, the UAV must at least execute some maneuvers to alter its attitude, which, in general, implies a deviation from its predefined flight path (PP). For example, the FIG. 2 illustrates a UAV flying along its path in the vicinity of a photographic target PT that is not in the current coverage of the image acquisition means. The UAV rotates around its X axis to roll so that the image acquisition means in form of a camera C points towards the photographic target PT to take one or several images. Once the images recorded, the UAV enters a recovery phase where the automatic navigation means are used to bring it back to cruise attitude and redirect it along some predefined path PP.

In this first example, the relatively simple movement uses only one rotation axis to place the UAV in a suitable position to take images from the photographic target PT. More complex movements are possible and mostly executed for reaching image acquiring positions as described below.

The navigation path and the maneuver to execute for acquiring images of the photographic target PT are programmed in a memory of a central control unit onboard of the UAV or on a remote computer. The program or control sequence to execute is generally computed by using the lateral and vertical distances as well as the relative orientation between the photographic target PT and the current position and orientation of the UAV. The current position and orientation of the UAV is determined with an inertial measurement unit (IMU) and/or a GPS (Global Position System) and/or a magnetometer and/or visual sensors and/or other sensors or external beacons. The process is carried out automatically. No human operator is sending commands to the aircraft in real-time during this maneuver.

Figure 3:
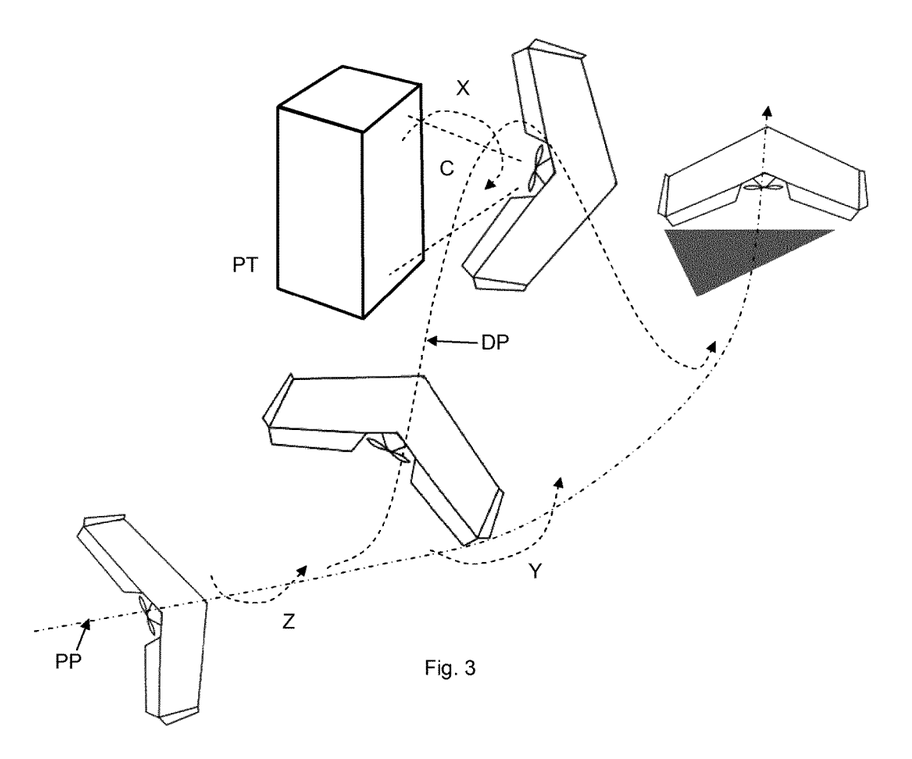
FIG. 3 shows a UAV deviating from its navigation path by a combination of movement according to the three axes for acquiring images of a target.

FIG. 3 provides a more complex example of a photographic target PT approached by a deviation of the UAV from its predefined navigation path PP. As, in this example, the camera is placed on the bottom face, the UAV flying horizontally along its path follows a curve or deviation path DP above the predetermined path PP initiated by an orientation modification around Z (yaw) and continued by pitching around Y and rolling around X until the photographic target PT enters in the visual field of the camera C. For returning to the nominal navigation path PP the UAV may execute the movements according to its axes in the inverse order, i.e. roll X, pitch Y and yaw Z. The shape and the spatial orientation of the curve of the deviation path DP depend mainly on the photographic target PT position relatively to the UAV and on its initial position on the navigation path PP.

In order to acquire a slanted image with a given perspective, the UAV should generally deviate from its predefined flight path (PP). For example, if a large extent of ground coverage is desired, the UAV may need to first climb to a higher altitude. Likewise, to achieve the desired perspective on the photographic target, the UAV must first adjust its position. For example, if a slanted image of photographic target must be acquired facing the south direction and the predefined flight path is along the south of the photographic target, the UAV must first navigate to a position that is north of the photographic target. Navigating to this position can be achieved using the automatic navigation means of the UAV. For that purpose, it is recommended to interrupt the regular operations and use the automatic navigation means to reach the target UAV position TUP corresponding to the desired image perspective DIP.

The desired image perspective DIP on the photographic target PT can be defined by two angles (see FIG. 4): (1) the bearing angle between the north direction and the projection on ground of the direction from which the optical axis intersect the photographic target and (2) the elevation angle between the optical axis and the ground plane. In addition to these two angles, the extent of the ground to be covered around the photographic target is also needed to uniquely define the desired image perspective. From the desired ground coverage and the field of view of the imager used, one can calculate the distance required between the photographic target PT and the target UAV position TUP. This distance is smaller for larger field of view, and larger for larger desired ground coverage. Using said distance together with both the bearing and elevation angle and the location of photographic target PT, relatively simple three-dimensional trigonometry allows to compute the target UAV position TUP.

Once the UAV is on the position TUP that allows acquiring the desired slanted image with the correct perspective, the UAV will then orient itself such as to orient its image acquisition device towards the photographic target PT. The exact orientation depends on the desired perspective DIP that should be achieved and the relative orientation of the image acquisition device with respect to the UAV. For example, acquiring an image of a photographic target with a 30° elevation angle requires the UAV to reach a 30° nose-down attitude towards the target if the image acquisition device is aligned along the longitudinal axis X of the UAV. If the image acquisition device is pointed downward when the UAV is level, then the UAV should reach a 60° nose-down attitude away from the target to achieve the same image perspective. Reaching a given attitude can be achieved using the automatic attitude control means of the UAV. The second step of the invention is therefore to use the automatic attitude control means to reach the target UAV orientation TUO corresponding to the desired image perspective DIP and subsequently trigger the image acquisition device to acquire the image with the desired perspective.

Figure 5:
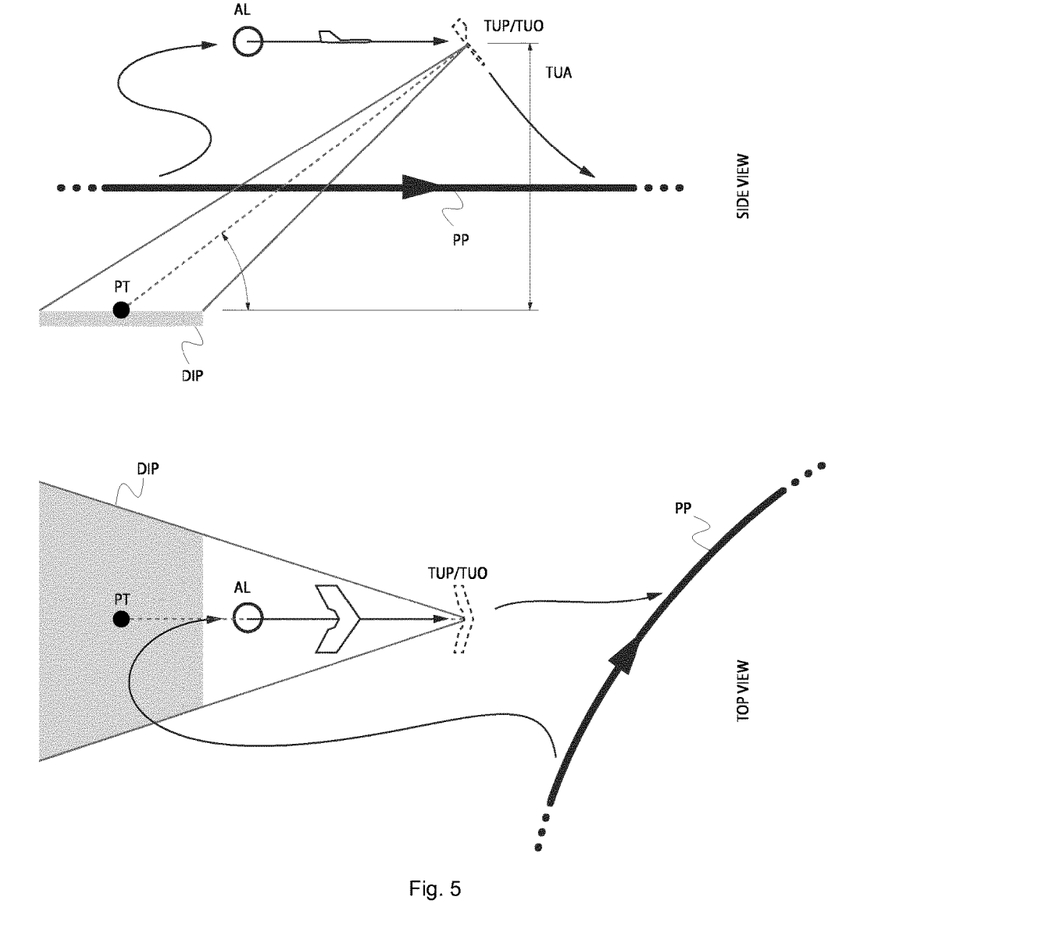
FIG. 5 shows how a UAV can be controlled to acquire desired image perspective DIP of a photographic target PT by means of an anticipatory location AL to reach the target UAV position TUP and orientation TUO.

One embodiment of this invention pertaining to UAV equipped with an image acquisition mean pointing downward when the UAV is level consists of reaching an anticipatory location AL placed on a line between the target UAV position TUP and the photographic target PT and at the target UAV altitude TUA (FIG. 5). The UAV then follows said line towards the target UAV position TUP and away from the photographic target PT. Once the target UAV position TUP is achieved, or in slight anticipation, the UAV pitch down to the required attitude and acquires the slanted image.

Typically, the anticipatory location AL is computed such that it provides a suitable anticipation trajectory for the UAV to reach the target UAV position TUP and orientation TUO precisely. The distance between the anticipatory location AL and the target UAV position TUP should be based on the typical dynamics of the UAV, such as its cruise speed and the capability of its automatic navigation means to quickly join a desired trajectory and maintain it. As an example, for a 500-gram flying wing flying at 10 m/s cruise speed, 75 meters would be a suitable distance between the anticipatory location AL and the target UAV position TUP.

Figure 6:
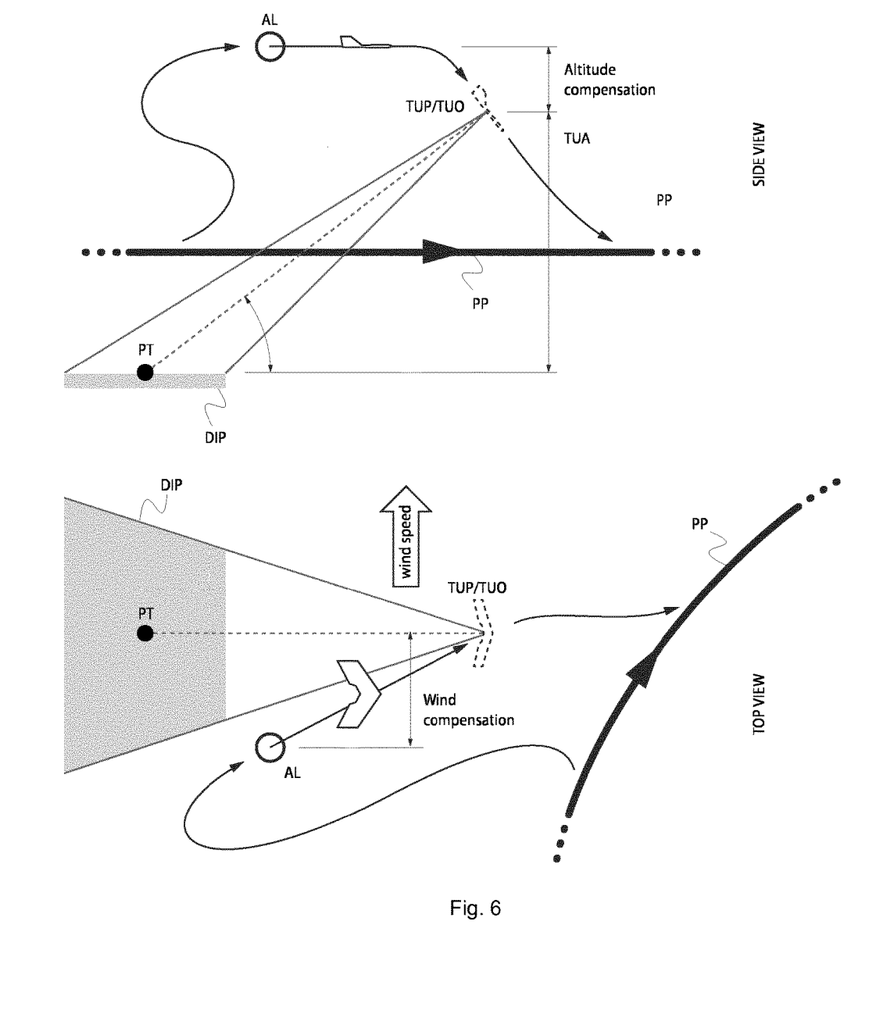
FIG. 6 shows how wind and altitude loss due to the image acquisition procedure can be compensated for by shifting the anticipatory location AL either horizontally or vertically.

The embodiment described above can be further improved by shifting the anticipatory location AL laterally such as to compensate for the lateral drift of the wind (FIG. 6, top view). Given the distance between the anticipatory location AL as discussed above and the wind speed, one can estimate the time required for the UAV to cruise from the anticipatory location AL to the target UAV position TUP. By multiplying the cross-wind component of the wind speed with said time, one obtains a distance that should be used to shift the anticipatory location AL laterally towards the wind. As a result, the UAV will laterally drift towards the target UAV position and will be correctly oriented when it reaches it. Alternatively, lateral wind can be compensated by rotating about the yaw axis Z in order to keep the nose of the UAV oriented towards the wind during the anticipatory trajectory.

In another desirable improvement, the altitude of the anticipatory location AL is increased to anticipate the altitude loss consecutive to the subsequent nose-down maneuver applied to achieve the target UAV orientation (FIG. 6, side view). Indeed, given the UAV dynamics and how fast its automatic attitude control means can control the UAV into the target UAV orientation TUO, there will be a delay before the target UAV orientation TUO is reached. During this maneuver, the UAV will likely reduce its altitude by some amount. By increasing the altitude of the anticipatory location AL by said amount, the UAV will reach both its target UAV position TUP and target UAV orientation TUO at the same time. As an example, for a 500-gram flying wing flying at 10 m/s cruise speed, an amount 5 to 10 m would be suitable.

Note that the presence of obstacles such as the ground, buildings, mountains, tall trees, etc. in the vicinity of the target UAV position can be taken into account in the computation of the anticipatory location AL. Similarly, some desired image perspective DIP could be rejected or disregarded because they are not feasible without taking the risk of crashing the UAV into said obstacles.

Figure 7:
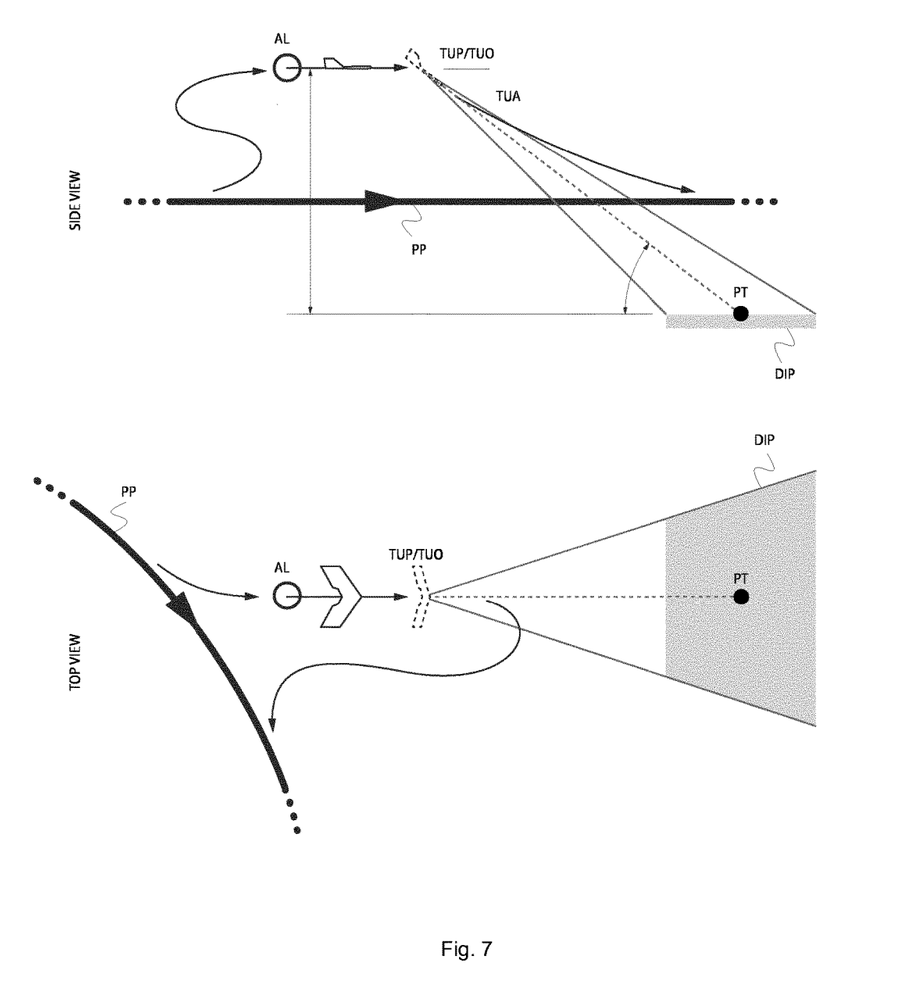
FIG. 7 illustrates the case where the imager or camera is frontally mounted on the UAV.

When the UAV is equipped with an image acquisition device pointing forward, the invention can be implemented by placing the anticipatory location AL away from the target UAV position TUP, with respect to the photographic target PT. The UAV will therefore reach the target UAV position TUP facing the target and will pitch down to reach the target UAV orientation TUO (FIG. 7). The way of computing the position of the AL is similar to the previous case where the camera is pointing downward. The difference is that the UAV should in this case fly towards the photographic target PT instead of away from it, as before.

Pitching down is not the only possible maneuver. In one embodiment pertaining to UAV with the image acquisition device pointing downward, the UAV pitches up at the target UAV position to reach the target. In this case, the altitude of the anticipatory location AL should be reduced to compensate the altitude gain during the pitching up maneuver prior to reaching the target UAV orientation.

Rotation about the roll axis X of the UAV can also be used to achieve the desired perspective. In one implementation, the UAV approaches the anticipatory location AL perpendicularly to the line defined by the photographic target PT and the anticipatory location AL. Upon reaching the anticipatory location AL, the UAV then achieves the target UAV orientation TUO by rotating about the roll axis before acquiring the image.

Similarly, rotation about the yaw axis Z can also be used, alone or in combination with other rotations, to reach the desired target UAV orientation TUP.

In some cases, it may be inconvenient to change flight altitude to acquire an image, for example in case of regulations on admissible flight altitude. Given this constraint, the target UAV position can be computed as the intersection of direction defined by the photographic target PT and the bearing and elevation angles with the plane defined by the current flight altitude. Since this constraint precludes to arbitrarily adjust the distance between the target UAV position and the photographic target PT, the extent of ground coverage can be adjusted only by varying the field of view of the imager.

One embodiment of the invention offers the operator a way to immediately acquire an image of the photographic target PT, independently of the current position of the UAV. The current position therefore becomes the target UAV position TUP, which defines both the bearing and elevation angles as well as the distance to the photographic target PT. The target UAV orientation TUO can be computed as described above in order to immediately use the automatic attitude control means to reach it.

In order to reduce vibrations and/or limit the speed, it may be beneficial to stop or slow down the propulsion motor M during capturing of the images. Once the images are recorded, the propulsion motor M is restarted or accelerated in order to bring the UAV back along the predefined path PP.

When the UAV approaches the photographic target PT, not only the propulsion motor M may alter its power, but the camera C can be activated by deployment of a retractable objective. When the UAV returns to its nominal path the camera enters in a cruise mode i.e. the objective is retracted.

Alternatively, the deployment of retractable objective(s) may be done at the beginning of a series of successive image acquisitions. Similarly, the retraction could be initiated only at the end of the series of acquisitions, for instance just before landing, in order to protect the imaging device(s).

In order to limit the maneuvers near the photographic target PT, the imaging devices may comprise a variable zoom having a variable zoom factor for adjusting their visual field and therefore the ground coverage without actively navigating to change the distance between the UAV and the photographic target.

It is to be noted that the target UAV orientation TUO as defined above does not constrain the orientation of the imager around its optical axis, which determines the orientation of the photographic target TP in the recorded image. However, in most cases, a rotation around that axis in order to get a desired final orientation is feasible, for instance by rotating around the yaw axis Z with the camera is pointing downward or by rotating around the roll axis X when the camera is pointing forward.

According to an embodiment, the UAV may comprise a plurality of image acquisition devices or cameras C1, C2 arranged on its fuselage. Each camera takes images from specific photographic targets PT1, PT2, etc, along some deviation path DP defined by the desired perspectives.

For example three-dimensional images may be acquired by directing towards a target two cameras C1, C2 arranged one beside the other on a same face of the UAV.

Figure 8:
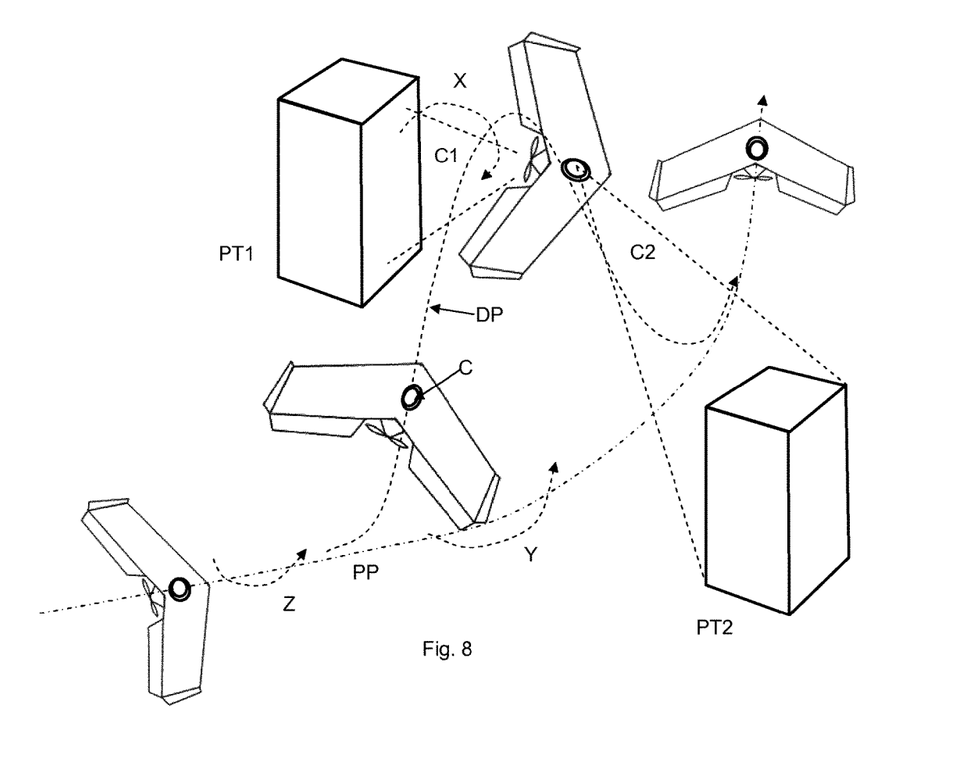
FIG. 8 shows a UAV equipped with two imagers or cameras acquiring images of two photographic targets PT by moving away from a predetermined path PP by moving sequentially around to the three axes.

FIG. 8 shows an example where the UAV uses one camera on each of its faces able to take images simultaneously at each side of the flying path by rolling 90 degree clockwise on the top of the deviation path DP curve.

An advantage of this multi-camera embodiment may be an optimization of the flying path P by a preliminary step of determining which camera to activate at approaching a photographic target. Depending on the position of the target relatively to the acquiring direction, the shape of the deviation path DP curve may change so that the maneuver of the UAV becomes less acrobatic.

A further advantage is that a simplified maneuvering or the capacity to take images of different photographic targets within a given area may save energy which is always desirable particularly for mobile autonomous devices. In fact, a path minimizing the yaw, pitch and roll movements accompanied by a minimum of propulsion motor speed variations may consume less electrical energy from the battery than a complex sequence of movements.

Furthermore, acquiring images of different parts of an area with more than one camera may also minimize the time of flight or the number of flights required to explore entirely a given area. In the example of FIG. 8, the UAV takes images from the targets PT1 and PT2 using respectively cameras C1 and C2 on each face of the UAV by flying once along a deviation path DP. Contrarily, in the case of a UAV with a single camera, at least two passages will be necessary to acquire images of the targets PT1 and PT2 or a complex maneuvering including additional rolling to direct the camera first towards the target PT1 and then towards the target PT2 or inversely.

Figure 4:
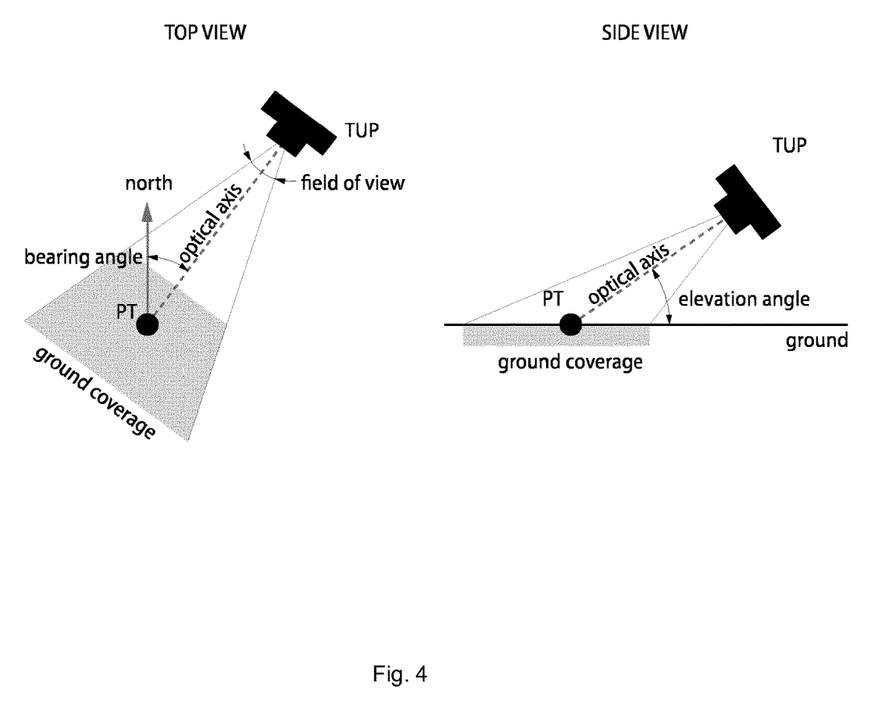
FIG. 4 shows the various parameters defining an image perspective.

In general, the perspective on a photographic target is characterized by the location of the photographic target PT, the bearing and elevation from which the imager is aimed and the distance between the photographic target PT and the imager (see FIG. 4). The method presented above uses all or a subpart of these parameters as input to determine the target UAV position TUP and target UAV orientation TUO. In general, these parameters could be obtained from an arbitrary source such as a human operator or a piece of software implementing some kind of automatic algorithm or artificial intelligence.

When the desired image perspective parameters are to be provided by a human operator on the ground, a user interface needs to be implemented. One embodiment of the invention includes a ground control station (GCS) in communication with the UAV via a wireless communication link. The GCS offers a graphical user interface (GUI) that allows the user to directly interact with an avatar of the desired image perspective from which the perspective parameters can be calculated. This avatar can take the form of the footprint on the ground that will be covered by the final image. By moving the footprint over a map display, the user can affect the photographic target PT location. By means of handles, sliders or other GUI widgets, the user can visually interact with the scale, orientation and slantedness of the footprint. From the resulting footprint layout, the GCS infers the bearing, elevation and distance parameters that define the perspective and sends them to the UAV for the acquisition of the image.

Another instance of this invention aims at systematically imaging a photographic target PT from a variety of perspectives where the bearing and elevation angles are systematically varied. In this instance, the user only specifies the location of the photographic target PT, for example by positioning an avatar on a map display. Then, a high-level supervisor module (software and/or hardware, located in the GCS and/or on the UAV) sequentially generates sets of bearing, elevation and distance parameters and triggers the acquisition of the related image in sequence. For each image acquisition instance, the procedure is as described above.

One further improvement consists in correcting the AL, the TUP or the TUO based on the previously acquired images. In particular, when an offset exists between the location of the PT in the recorded image and the center of it, an error can be computed and back propagated to the parameters of the AL, the TUP and/or the TUO. One way of estimating this error would be by using modern computer vision techniques to recognize the photographic target TP in one or several previously recorded image(s).

The invention claimed is:

1. A method for acquiring images of a photographic target from arbitrary perspectives with an unmanned aerial vehicle (UAV) equipped with at least one image acquisition device having a fixed acquisition direction with respect to the vehicle, said UAV having an automatic navigation system that allows the UAV to reach an arbitrary location and automatic attitude control system that allows the UAV to transiently reach an arbitrary orientation in space, said photographic target being outside a current field of view of the acquisition device while the UAV flies along a predefined flying path, the method comprising the steps of:
   computing a target UAV position and an orientation in space required to acquire a desired slanted image from a set of parameters pertaining to the desired photographic target, a desired perspective and a relative orientation of the image acquisition device with respect to the UAV;
   determining an anticipatory location at a target UAV altitude and spaced apart from the target UAV position at a distance determined by one or more flight dynamics of the UAV, the anticipatory location being on a line between the target UAV position and the photographic target; and
   navigating, using the automatic navigation system, to said anticipatory location before navigating to the target UAV position;
   navigating, after reaching the anticipatory location, using the automatic navigation system, to said target UAV position;
   modifying an attitude, which comprises modifying at least one of a pitch or roll of the UAV in order to modify the acquisition direction to point toward the photographic target, thereby deviating from the predefined flying path into a transient phase of flight;
   acquiring images during the transient phase of flight when the acquisition direction points toward the photographic target with the desired perspective; and
   starting a recovery phase by controlling the UAV back to the predefined flying path.

2. The method according to claim 1, further comprising the step of determining, a direction and an amplitude of a wind and shifting the anticipatory location laterally such that to compensate for a lateral drift of the wind.

3. The method according to claim 1, further comprising the steps of:
   calculating a new altitude resulting from modifying a current attitude of the UAV; and
   shifting the anticipatory location vertically to compensate for the new altitude.

4. The method according to claim 1, further comprising the steps of:
   deploying a retractable objective of the image acquisition device while the UAV is in the air or when the UAV reaches the target position; and
   retracting the retractable objective after the image acquisition device has finished acquiring the images or before landing.

5. The method according to claim 1, wherein the image acquisition device comprises an objective with zoom capabilities, the method further comprising the step of:
   taking into account the zoom factor to determine the target position.

6. The method according to claim 1, wherein the UAV comprises a plurality of image acquisition devices arranged on its airframe, each acquiring device taking images in sequence.

7. The method according to claim 1, wherein the UAV is powered by a propulsion motor during the navigation, the method further comprising the step of reducing a speed of the UAV or stopping said motor when acquiring the images.

8. The method according to claim 1, wherein the computing of the target UAV position comprises the steps of:
   determining, on a map display, a ground coverage trapeze defining a desired image and perspective by means of virtual handles allowing to change the trapeze position, shape and orientation; and
   calculating the target position and orientation of the UAV by taking into account the field of view of the acquisition device.

9. The method according to claim 1, in which a series of images are acquired in order to systematically cover a photographic target from various bearings or elevations, thus defining a series of set of parameters calculated according to the steps of:

determining on a map display a photographic target and a width of ground coverage;

defining a bearing or elevation resolution determining an angle increment between a plurality of successive bearings or elevations for the UAV; and calculating each set of parameters by successively changing the bearing or elevation according to a bearing or elevation resolution thus determining a set of successive target positions and orientations of the UAV.

* * * * *